(No Model.)
C. SELDEN.
DUPLEX TELEGRAPHY.
No. 375,898. Patented Jan. 3, 1888.
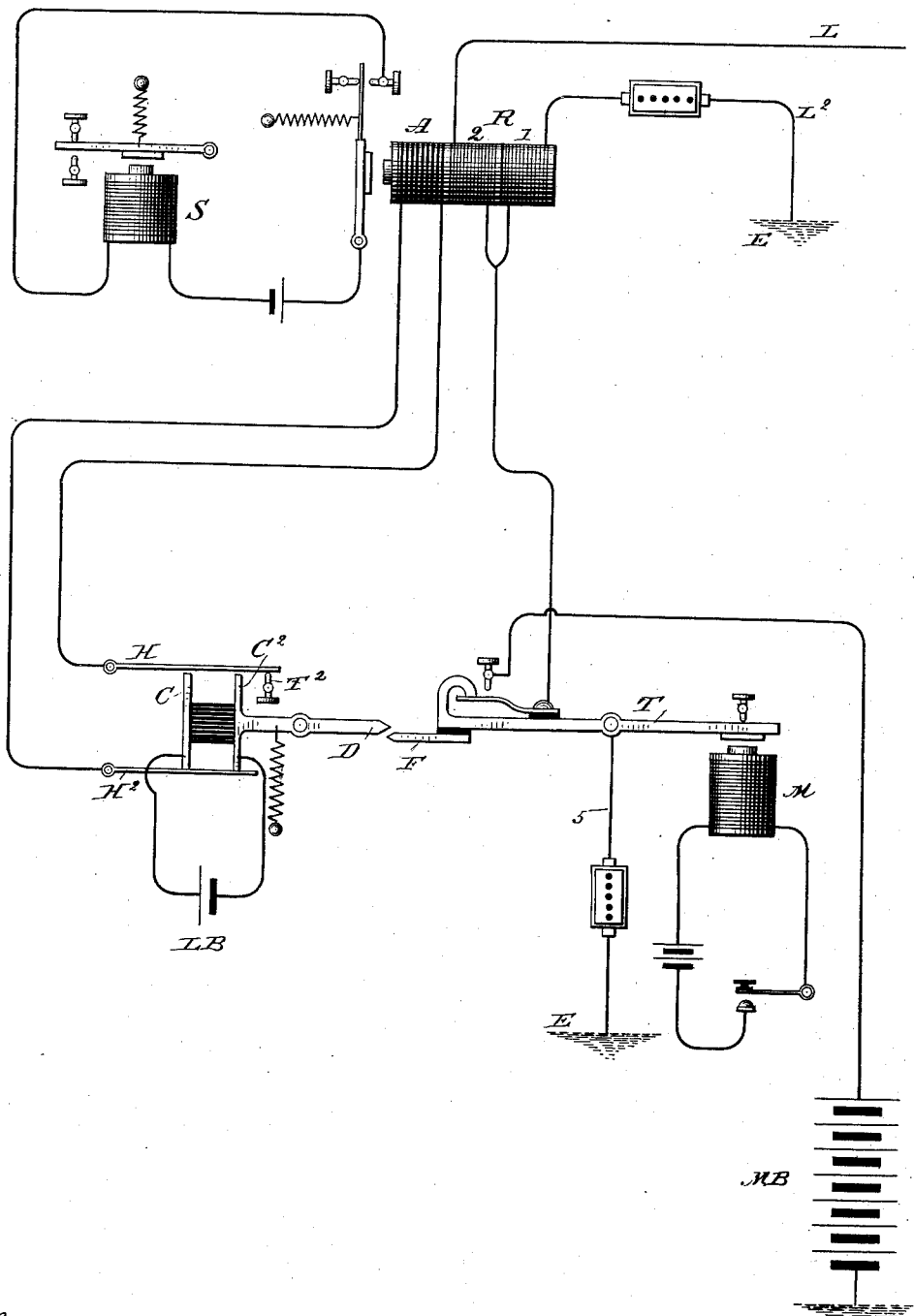
Witnesses:
Ernst Abshagen
Thos. Dooney
Inventor:
Charles Selden
By his Attorney: H. C. Townsend

UNITED STATES PATENT OFFICE.

CHARLES SELDEN, OF BALTIMORE, MARYLAND.

DUPLEX TELEGRAPHY.

SPECIFICATION forming part of Letters Patent No. 375,898, dated January 3, 1888.

Application filed October 10, 1884. Serial No. 145,125. (No model.)

*To all whom it may concern:*

Be it known that I, CHARLES SELDEN, a citizen of the United States, and a resident of Baltimore, in the State of Maryland, have invented certain new and useful Improvements in Static Compensators for Duplex and Multiplex Telegraphs, of which the following is a specification.

The object of my invention is to provide a means whereby the disturbing effects of the static charge and discharge upon the receiving apparatus of duplex or multiplex telegraphs may be avoided.

To this end my invention consists in the combination, with the receiving-relay, of an auxiliary or neutralizing coil wound upon the core of said relay, and a circuit-controller governed by the transmitting apparatus and controlling the circuit of a battery or other source of electricity arranged to be placed in a complete or closed galvanic circuit with the auxiliary coil, said circuit-controller being actuated at the instant of the static discharge or the static charge, so as to permit the current from the battery to flow momentarily in the neutralizing-coils, and to thus neutralize in the relay-core the magnetism which would otherwise be produced by the effects of the static discharge or charge.

As a circuit-controller I prefer to employ a current-reverser or pole-changer, since with such a device I may then more readily provide for a neutralizing of the disturbing effects of the static charge and discharge by causing the battery-current to flow in the neutralizing-coils in one direction at the instant of the charge and in the other direction at the instant of the static discharge.

It is well known in the art that at the instant the main or signaling battery is put to line there is a momentarily greater flow in the main or line branch than in the artificial line or branch, owing to the greater charge capacity of the main line. This is the so-called "static-charge" current, and tends to momentarily affect the relay-armature and produce a false signal. When, after the main battery has been put to line, the transmitter is opened and the line put to earth, as required in systems of simultaneous transmission in opposite directions, a discharge current, known as the "static discharge," flows through the relay from the line and produces a momentary disturbance by magnetizing the core of the relay. The static discharge flows in an opposite direction from the charge and tends therefore to impart opposite magnetism to the core. To neutralize its effects it is obviously necessary to cause current to flow in the auxiliary neutralizing-coils in opposite directions at the times of static charge and discharge, respectively. This is accomplished by the use of the pole-changer, as hereinafter described. To operate the circuit-controller or pole-changer, any means may be employed that shall actuate the same simultaneously with the movements of the transmitting apparatus on putting the main battery to line and the line to earth. A direct mechanical connection may be employed for this purpose, or any other means may be used whereby the movements of the controller may be properly governed. I propose to use current from any generating source—such as a battery—for acting in the neutralizing-coils, the circuit from such source through the neutralizing-coils being directly governed by the circuit-controller.

One of the ways in which my invention may be carried into practice is shown in the accompanying drawings, illustrating diagrammatically the connections of the parts and the application of the invention to the relay of an ordinary differential duplex.

The application of the invention to quadruplex or multiplex telegraphs or to the receivers of other systems of simultaneous transmission will be apparent from a description of the manner of applying the same to the relay of a simple duplex.

R indicates the differentially wound relay, having the two sets of coils 1 and 2 wound or connected reversely and placed, respectively, in the branch to line L and in the artificial line L² to earth, as usual in the art.

S indicates any sounder controlled by the relay, and T a transmitter of usual construction, which is operated by an electro-magnet in a local circuit with a key, and serves to put the main-line battery M B to line at the beginning of a signal, and at the termination of a signal to disconnect the battery from line and simultaneously connect the line to earth through wire 5. All these devices and connections are of the usual and well-known kind.

A indicates an auxiliary static neutralizing-coil wound on the core of the relay R, and L B a local battery whose current is made to momentarily flow through the coils A in one direction at the instant of the static charge and in the opposite direction at the instant of the static discharge.

D indicates the lever of the circuit-controller by which the common circuit of the battery and coils is governed. In the present instance the lever is acted upon directly by a projecting pointed piece, F, supported upon, but insulated from, the transmitter-lever T, and arranged in position to engage with the pointed end of the lever D and move the same a slight distance, and then automatically disengage itself on the upward and downward movement of F with lever T. The lever D carries two contact plates or points, C C², insulated from one another and connected, respectively, with the opposite poles of the battery L B. They both normally rest on a contact-spring, H², connected with one terminal of coil A, and are just out of contact with the spring H, connected with the other terminal of said coil.

The parts described in effect form the essential elements of an ordinary pole-changer. A stop, T², serves to prevent the spring H from coming into contact with the plates C C², the purpose of thus having the contact broken being to keep the coils A in open circuit and to thus prevent disturbance which might result, from the fact that otherwise said coils would be in closed circuit and would tend to retard the discharges of the core of the relay. It is obvious that if the lever D be moved in one direction current from L B will flow in one direction through the coils A, while current will flow in the opposite direction in said coils if the lever be turned in the opposite direction.

The general operation would be as follows: When the transmitter T puts main battery to line, the core of R tends to produce false movement of its armature by the influence of the static charge. Simultaneously, however, with the closing of the circuit between the line and the battery M B the point F moves the lever D and puts the battery L B into the circuit with the coils A in such direction as to neutralize the momentary effect of the static charge on the core of the relay; but as the lever T moves on for a slight distance farther, the point F slips by D and the latter returns to its normal position, so that no current flows in the coils of A. The current from M B continues, however, to flow to line, as required; but as in the meantime the current in the main and artificial lines has become equalized, a balance between the effects of coils 1 and 2 exists without the neutralizing or compensating effects of coil A. When the transmitter T returns to its normal position, and at the instant of putting the line to earth, the static discharge-current flows, but in an opposite direction to the static charge. The effect of this, if unopposed in the core of the relay, would be to produce a false signal; but simultaneously the point F in its downward movement impinges upon the top of the pointed end of lever D and moves the same, so as to put battery L B momentarily in circuit with A, but with the opposite polarity to that existing at the instant of the static charge, thus overcoming the influence of the static-discharge current. As the lever T moves toward its position of rest, the point F escapes by D, and the parts resume their normal position, as indicated.

My invention is obviously not limited to any particular form or construction of circuit-closer, nor to any particular mechanism for giving the properly-timed movements thereto corresponding with the movements of the transmitter in placing the line to battery and earth.

I am aware of English Patent No. 3,879 of 1873, and do not therefore wish to be understood as claiming any invention shown in said patent.

What I claim as my invention is—

1. The combination, with the receiving apparatus for a duplex telegraph, of an auxiliary static neutralizing-coil upon a core of a receiving magnet, and a current-controller governed by the transmitter and placed in a complete galvanic circuit that is uninterrupted save at the contacts of the controller and contains the neutralizing-coils, together with a battery, the current from said battery being made to flow momentarily in the neutralizing-coil and through the complete galvanic circuit by the operation of the circuit-controller and to be instantly interrupted by the continued movement of said controller.

2. In a duplex or multiplex telegraph, the combination, with a receiving-relay, of an auxiliary static neutralizing-coil in a local circuit, with a battery, and a pole-changer controlling the circuit of the battery and coils and momentarily actuated with the transmitter at the instant of the static charge and discharge, as and for the purpose described.

Signed at New York, in the county of New York and State of New York, this 25th day of September, A. D. 1884.

CHARLES SELDEN.

Witnesses:
THOS. TOOMEY,
GEO. C. COFFIN.